Patented Sept. 27, 1932

1,879,022

UNITED STATES PATENT OFFICE

EARLE H. BARCLAY, OF BALTIMORE, MARYLAND, ASSIGNOR TO THE SILICA GEL CORPORATION, OF BALTIMORE, MARYLAND, A CORPORATION OF MARYLAND

CATALYTIC GEL AND METHOD OF MAKING SAME

No Drawing.     Application filed October 3, 1929.  Serial No. 397,142.

The present invention relates to adsorbent and catalytic gels of oxide of tin and methods of making the same.

More specifically, it is directed to a method of producing gels of tin oxide alone, or mixed gels of tin oxide and another oxide or oxides, for example, aluminum oxide, tungstic oxide, titanium oxide, ferric oxide, silicon dioxide, as well as others; and also to the gels themselves as products of manufacture.

The principal object of the invention is to produce a gel of tin oxide alone, or a gel of mixed oxides of tin and another element or elements possessing great adsorbing or catalytic powers, and by methods which are commercially practicable.

According to the present invention, for the preparation of a highly porous gel of stannic oxide, a 5% to 10% stannic chloride solution is mixed with a solution of an alkali such as ammonium hydroxide, sodium hydroxide, or potassium hydroxide, in such proportions that the excess acidity of the reaction mixture lies between neutrality and 0.5 N acidity.

While reaction mixtures having an acidity between neutrality and 0.5 N acid set to a hydrogel or jelly, and produce the best gels, it has been found that reaction mixtures of an acidity close to 0.5 N acid do not set as quickly as do mixtures of an acidity in the proximity of neutrality. The setting of the mixtures having the greater acidity may be expedited by heating the mixture to a temperature of 75° to 100° C.

It has also been determined that reaction mixtures having an acidity close to neutrality are not as stable as reaction mixtures having an acidity close to 0.5 N acid, that is, such reaction mixtures set to a hydrogel or jelly too quickly. Such mixtures may be stabilized by cooling the respective solutions before mixing to a temperature below ordinary temperatures, for example, 2° C., and maintaining such low temperature during the entire mixing of the respective solutions. Effecting the mixing of the respective solutions at a low temperature, for example 2° C. causes a prolonging of the setting time of the reaction mixture to a hydrogel or jelly. If desired, the reaction mass obtained by mixing at a low temperature may be caused to set quickly by heating the same to a temperature of about 60° C. to 90° C.

Reaction mixtures formed by effecting the mixing of the respective solutions at ordinary temperatures, for example 15° C. to 25° C., and having an acidity of about 0.13 to 0.18 N acid are preferred.

A preferred method for making a stannic oxide gel consists in adding a 2.5% to 3% ammonium hydroxide solution to an equal volume of a 10% stannic chloride solution or by bringing the two solutions together simultaneously. During the mixing or bringing together of the two solutions it is essential that the reaction mixture be thoroughly agitated. In the case where the two solutions are brought together simultaneously, care should be taken that the mixture is acid. The mixing of the respective solutions is performed at ordinary temperatures, for example 15° C. to 25° C. The acidity of the reaction mixture should be about 0.13 to 0.18 N acid.

The reaction mixture upon being allowed to stand sets to a hydrogel or jelly within about 4 to 30 hours. The hydrogel is then thoroughly washed by decantation until practically free of salts whereupon it is slowly dried at a temperature of around 100° C. or a little thereabove. After being subjected to this temperature for an hour or two, depending upon the ventilation of the dryer, the temperature is raised to 150° to 200° C. for about two hours. The washing, previously mentioned, may be effected at any point before, during or after, the drying but it is preferred to thoroughly wash the hydrogel before drying.

Tin salts other than the chloride such as stannic nitrate may be used as described above, and they may be used in aqueous solution.

The factors which control the formation of the hydrogel are the concentration and proportions of the stannic salt solution and the alkali solution employed, the particular manner in which the two solutions are mixed, the rate at which the two solutions are brought together, and the acidity of the reaction mixture. All of these factors control the properties of the dehydrated gel obtained from the hydrogel formed by the setting of the reaction mixture.

In addition to a gel of tin oxide, other gels may be made comprising tin oxide and one or more other oxides such as aluminum oxide, tungstic oxide, titanium oxide, ferric oxide, silicon dioxide, as well as others. For example, a plural gel consisting of stannic oxide and silicon dioxide may be prepared as follows:

Equal volumes of a 10% stannic chloride solution and a sodium silicate solution of a specific gravity of 1.1 to 1.12 depending upon the strength of the silicate solution used, are mixed at ordinary temperatures. The sodium silicate solution may be added to the stannic chloride solution or the two solutions may be brought together simultaneously. During the mixing of the two solutions it is essential that the reaction mixture be vigorously agitated. The reaction mixture should be acid, having an acidity ranging between neutrality and 0.5 N acid.

The reaction mixture after a period of time, say for example, one minute to sixteen hours, sets as a whole to a hydrogel or jelly. The jelly consisting of a mixture of stannic and silicic acids is then thoroughly washed with water, whereupon it is dried at about 100° C. or a little thereabove, and thereafter subjected to a higher temperature for instance, 150° to 200° C. for two or three hours. The resulting product will contain not less than about 3% of water, depending upon the length of time of drying, temperature, etc. The washing may be effected at any point before, during or after, the drying, or at two or more of said points, but it is preferred to wash the material thoroughly before drying.

The following is an example of a method for obtaining a gel comprising the oxides of both tin, and aluminum:

A solution of sodium aluminate of approximately 4.2% strength is added with agitation to an equal volume of a 10% stannic chloride solution. The mixing is performed at ordinary temperatures, and the sodium aluminate solution is added to the stannic chloride solution, the aluminate solution being added in such manner that the reaction mass is acid during the mixing of the two solutions. The acidity of the reaction mixture should be preferably between neutrality and 0.5 N acid.

The reaction mixture sets within about five minutes to a soft jelly-like mass. This jelly-like mass is then washed by dumping same into a large quantity of water containing a slight amount of an alkali such as ammonium hydroxide. When the jelly-like mass has settled, the water is separated therefrom by decantation. This washing of the jelly-like mass with a weakly alkaline wash water is repeated, and the jelly-like mass is then washed several times with pure water. The hydrogel or jelly is then dried as described above for the individual gels or mixture of gels.

A gel comprising the oxides of tin and titanium may be prepared according to the following example:

To a given volume of a 10% stannic chloride solution is added an equal volume of a 7.3% solution of titanium chloride. To this mixture of stannic and titanium chlorides is then added slowly with agitation an ammonium hydroxide solution containing about 4.5 grams $NH_3$ per 100 cc. of liquid in an amount equal to the given volume of either of the metal chloride solutions. The ammonium hydroxide solution is added to the mixture of titanium and stannic chlorides in such manner that the reaction mass is acid during the entire mixing.

The reaction mixture sets after a period of time, for instance 24 hours, to a jelly-like mass. The hydrogel or jelly-like mass is then thoroughly washed with water so as to free it of reaction salts. The washing may be effected by any of the well known methods such as decantation and the like. The jelly may then be dried as described above in connection with the preparation of the other gels.

A gel consisting of the oxides of tin and iron may be prepared according to the following process:

A stannic chloride solution is mixed with a ferric chloride solution, and to this mixture of tin and iron chloride solutions is then added with stirring an alkali solution such as ammonium hydroxide. The ammonium hydroxide solution should be added to the mixture at such a rate that the reaction mass during the mixing is slightly acid to litmus or neutral. Water soluble salts of tin and iron such as nitrates or sulphate may be employed instead of the chlorides.

A specific example for making a plural gel consisting of the oxides of tin and iron consists in adding a 10% ferric chloride solution to an equal volume of a 10% stannic chloride solution, and then adding to the mixture, an ammonium hydroxide solution of a 3.2% strength gradually and with agitation. The quantity of ammonium hydroxide employed is such that the reaction mass is acid. It is to be understood, however, that other concentrations of the metal solutions can be employed and that an ammonium hydroxide solution of a strength and amount other than that named above can also be used in the process.

The reaction mixture after a short time sets to the consistency of a thick paste. The pasty-like mass or hydrogel is then washed by pouring the hydrogel into a large volume of water, and adding ammonium hydroxide thereto until the water is just slightly alkaline to litmus. This alkaline wash water causes the hydrogel to separate out somewhat so that the washing by decantation can be facilitated. Subsequent additions of wash water after each decantation need not be made alkaline with ammonia as the hydrogel settles out quite well. By subjecting the hydrogel to three of four decantations with water, the hydrogel is practically free of electrolytes.

The washed hydrogel may then be dried partially by placing same upon a suction filter of a large area and then completely dried by placing same in an oven or the entire drying operation may be performed in an oven. The drying of the hydrogel in the oven is the same as that described above in connection with the preparation of the other gels.

A plural gel consisting of oxides of tin and tungsten may be prepared according to the following method:

To 10 cc. of a 10% stannic chloride solution is added 12 cc. of an 8% sodium tungstate solution with agitation. The hydrated oxides thus formed do not imbibe all of the liquid present, but are precipitated as a white, voluminous, jelly-like mass which settles out somewhat upon standing.

The jelly-like mass may then be washed by decantation. Three or four washings are usually sufficient to remove the reaction salts therefrom.

The drying of the jelly-like mass or hydrogel may be effected in the same manner as above described in connection with the preparation of the other gels.

If a plural gel consisting of the oxides of tungsten and tin is required in which there is less tungsten than tin, such gel may be prepared as follows:

To 10 cc. of a 10% stannic chloride solution is added 5 cc. of an 8% sodium tungstate solution, and to this mixture of stannic and tungstate solutions is then added with agitation 2 cc. of a 10% ammonium hydroxide solution with agitation. It is also possible to add the ammonium hydroxide to the sodium tungstate solution, and then add such mixture to the stannic chloride solution with agitation. The resulting mixture in each case is slightly acid.

The mixture of hydrated oxides of tungsten and tin sets after a time to a hydrogel or jelly, and is then washed and dried in the same manner as above described.

Where a plural gel consisting of the oxides of tin and tungsten is required in which there is less tin than tungsten, such gel may be prepared as follows:

To 7.5 cc. of a 10% stannic chloride solution about 2.5 cc. of a 10% HCl solution is added, and to this mixture is then added with agitation about 17 cc. of an 8% sodium tungstate solution. The resulting mixture which is acid sets to a hydrogel within a short period of time. The hydrogel is then washed and dried in the same manner as above pointed out.

It is to be noted that by the processes above described it is possible to produce plural gels of oxides of tin and tungsten in which the ratio of tungsten to tin is substantially equal or less or more than one. In the case where a plural gel is desired in which there is less tungsten than tin, such gel may be prepared by using a lesser quantity of the tungstate solution than that required to react with the tin salt solution, and supplying the deficiency in alkali by the addition of an alkali. In the case, where a plural gel is desired in which there is less tin than tungsten, such gel may be prepared by using a lesser quantity of the tin salt solution than that required to react with the tungstate solution, and supplying the deficiency in acid by the addition of an acid.

The foregoing processes wherein there is formed a plural gel composed of the oxide of tin together with another oxide, including the oxides of titanium, iron and tungsten, are covered in a copending application Serial No. 539,424, filed on May 22, 1931.

A specific example for making a plural gel consisting of the oxides of tin, silicon and tungsten comprises adding 10 cc. of a sodium silicate solution of a specific gravity of 1.4 to an equal volume of a 10% solution of a sodium tungstate with agitation. To the solution thus formed is then added a 10% stannic chloride with agitation. The quantity of stannic chloride employed is such that the reaction mass is alkaline, preferably of an alkalinity of 0.5 to 0.65 N alkali.

The reaction mass upon being allowed to stand sets to a hydrogel or jelly within about 3 minutes to 10 hours. The hydrogel is then thoroughly washed by decantation until practically free of salts whereupon it is slowly dried at a temperature around 100° C. or a little thereabove. After being subjected to this temperature for about an hour or two, depending upon the ventilation of the drier, the temperature is raised to 150° to 200° C. for about 2 hours. The washing, previously mentioned, may be effected at any point before, during, or after the drying but it is preferred to thoroughly wash the hydrogel before drying.

The foregoing process, wherein there is formed a plural gel composed of the oxides of tin, silicon and tungsten, is covered in a copending application Serial No. 539,425, filed on May 22, 1931.

The catalytic gel of oxide of tin, and the plural gels consisting of tin oxide and one or more of the following oxides: aluminum, tungsten, titanium, iron, and silicon, are hard, stable products. They have pores of such a size as to adsorb water vapor to such an extent as to contain at least 10% of water by apparent volume, or by weight, when in equilibrium with water vapor at 30° C. and a partial pressure of 22 mm. of mercury. The per cent by apparent volume of water vapor adsorbed by the various gels under the above noted conditions may be tabulated as follows:

| Gels | Apparent density | Per cent by weight H$_2$O adsorbed 22 mm. partial pressure at 30° C. | Per cent by apparent volume H$_2$O adsorbed at 22 mm. and 30° C. |
|---|---|---|---|
| SnO$_2$ | 1.6 | 15. | 24. |
| SnO$_2$WO$_3$ | 1.9 | 18. | 34. |
| SnO$_2$TiO$_2$ | 1.3 | 23. | 30. |
| SnO$_2$Al$_2$O$_3$ | 0.9 | 21. | 19. |
| SnO$_2$Fe$_2$O$_3$ | 1.3 | 17. | 22. |
| SnO$_2$SiO$_2$WO$_3$ | 0.4 | 48. | 19. |

The "per cent by apparent volume" is the product of the weight of water vapor adsorbed in a quantity of adsorbent expressed in per cent (of the dry weight), and the apparent density of the adsorbent. Thus, if a quantity of gel having an apparent density of 1.7 adsorbs 15% by weight of water, the "per cent by apparent volume" of water adsorbed is 25.5%. This is the product of 15 (percentage by weight) and 1.7 (apparent density).

The apparent density is the weight (expressed in grams) of a cubic centimeter of particles of a predetermined size. For example, if 100 grams of a gel made up of 8–14 mesh particles has a volume of 59 cc., the apparent density of the gel is 1.7, obtained by dividing the weight (100) by the volume (59).

Having thus described the invention, what is desired to be secured by Letters Patent is set out in the appended claims.

1. The method of preparing gels which comprises bringing together an alkaline solution and a stannic salt solution with agitation, the proportions and concentrations of the two solutions being such that the reaction mass has an acidity ranging between neutrality and 0.5 N acid.

2. The method of preparing stannic oxide gel which comprises bringing together a solution of an alkali and a stannic salt solution with agitation, the proportions and concentrations of the two solutions being such that the reaction mass has an acidity ranging between 0.13 and 0.18 N acid.

3. The method of preparing stannic oxide gel which comprises bringing together a solution of an alkali and a stannic salt solution with agitation at a temperature not exceeding 25° C., the proportions and concentrations of the two solutions being such that the reaction mass has an acidity ranging between neutrality and 0.5 N acid.

4. The method of preparing stannic oxide gel which comprises bringing together a solution of an alkali and a stannic salt solution with agitation at a temperature not exceeding 25° C., the proportions and concentrations of the two solutions being such that the reaction mixture has an acidity between 0.13 and 0.18 N acid.

5. The method of preparing stannic oxide gel which comprises bringing together a 5% to 10% stannic salt solution and a solution of an alkali with agitation, the proportions and concentrations of the two solutions being such that the reaction mass has an acidity ranging between neutrality and 0.5 N acid, whereupon, after a time, the mixture will set to a hydrogel or jelly, washing said hydrogel, and removing most of the water from the resulting product.

6. The method of preparing stannic oxide gel which comprises bringing together a 5% to 10% stannic salt solution and a solution of an alkali with agitation, the proportions and concentrations of the two solutions being such that the reaction mass has an acidity ranging between neutrality and 0.5 N acid, whereupon, after a time, the mixture will set to a hydrogel or jelly, washing said hydrogel, and drying the hydrogel at a temperature of about 100° C. to drive off a part of the moisture and then slowly increasing the temperature to drive off the greater part of the remaining moisture.

7. The method of preparing stannic oxide gel which comprises bringing together a 2.5% to 3% ammonium hydroxide solution and a 10% stannic chloride solution with agitation, the proportions of the two solutions being such that the reaction mass has an acidity between 0.13 and 0.18 N acid.

8. The method of preparing stannic oxide gel which comprises bringing together a 2.5% to 3% ammonium hydroxide solution and a 10% stannic chloride solution with agitation at a temperature not exceeding 25° C., the proportions of the two solutions being such that the reaction mass has an acidity between 0.13 and 0.18 N acid.

9. The process of preparing a plural gel of stannic oxide and a silicon dioxide which comprises bringing together a stannic salt solution and a soluble silicate solution with agitation, the proportions and concentrations of the two solutions being such that the reaction mass has an acidity ranging between neutrality and 0.5 N acid.

10. The method of preparing a plural gel of stannic oxide and silicon dioxide which comprises bringing together a 10% stannic salt solution with a soluble silicate solution with agitation, the proportions and concentrations of the two solutions being such that the reaction mass has an acidity ranging between neutrality and 0.5 N acid.

11. The method of preparing a plural gel of stannic oxide and silicon dioxide which comprises bringing together a stannic salt solution and a soluble silicate solution of a specific gravity of 1.1 with agitation, the proportions and concentrations of the two solutions being such that the reaction mass has an acidity ranging between neutrality and 0.5 N acid, whereupon, after a time, the mixture will set to a hydrogel, washing the hydrogel, and removing most of the water from the resulting product.

12. The method of preparing a plural gel of stannic oxide and silicon dioxide which comprises bringing together a stannic salt solution and a soluble silicate solution of a specific gravity of 1.1 with agitation at a temperature not exceeding 25° C., the proportions and concentrations of the two solutions being such that the reaction mass has an acidity ranging between neutrality and 0.5 N acid, whereupon, after a time, the mixture will set to a hydrogel, washing the hydrogel, and removing most of the water from the resulting product.

13. The method of preparing a plural gel of stannic oxide and silicon dioxide which comprises bringing together a stannic salt solution and a soluble silicate solution of a specific gravity of 1.1 with agitation, the proportions and concentrations of the two solutions being such that the reaction mass has an acidity ranging between neutrality and 0.5 N acid, whereupon, after a time the mixture will set to a hydrogel, washing the hydrogel, and drying the hydrogel at a temperature of about 100° C. to drive off a part of the moisture and then slowly increasing the temperature to drive off the greater part of the remaining moisture.

14. A hard, stable, and highly porous plural gel consisting of stannic oxide and silicon dioxide.

15. The process of preparing a plural gel consisting of the oxides of tin and aluminum, which comprises bringing together a stannic salt solution and a soluble aluminate solution with agitation, the proportions and concentrations of the two solutions being such that the reaction mass has an acidity ranging between neutrality and 0.5 N acid.

16. The process of preparing a plural gel consisting of the oxides of tin and aluminum, which comprises bringing together a 10% stannic salt solution and a solution of a soluble aluminate with agitation, the proportions and concentrations of the two solutions being such that the reaction mass has an acidity ranging between neutrality and 0.5 N acid.

17. The process of preparing a plural gel consisting of the oxides of tin and aluminum, which comprises bringing together a stannic salt solution and a soluble aluminate solution with agitation, the proportions and concentrations of the two solutions being such that the reaction mass has an acidity ranging between neutrality and 0.5 N acid, whereupon, after a time, the mixture will set to a hydrogel, washing the hydrogel, and removing most of the water from the resulting product.

18. The process of preparing a plural gel consisting of the oxides of tin and aluminum, which comprises bringing together equal volumes of a 10% stannic salt solution and a solution of a soluble aluminate with agitation, the proportions and concentrations of the two solutions being such that the reaction mass has an acidity ranging between neutrality and 0.5 N acid, whereupon, after a time, the mixture will set to a hydrogel, washing the hydrogel, and removing most of the water from the resulting product.

19. The process of preparing a plural gel consisting of the oxides of tin and aluminum, which comprises bringing together a stannic salt solution and a soluble aluminate solution with agitation, the proportions and concentrations of the two solutions being such that the reaction mass has an acidity ranging between neutrality and 0.5 N acid, whereupon, after a time, the mixture will set to a hydrogel, washing the hydrogel with an alkaline water, and drying the hydrogel.

In testimony whereof I hereunto affix my signature.

EARLE H. BARCLAY.